(12) United States Patent
Chen et al.

(10) Patent No.: US 6,268,951 B1
(45) Date of Patent: Jul. 31, 2001

(54) OPTICAL SIGNAL INTERLEAVER/ DEINTERLEAVERS

(75) Inventors: Jye-Hong Chen, San Jose; Kuochou Tai, Fremont, both of CA (US)

(73) Assignee: JDS Uniphase Corporation, San Jose, CA (US)

(*) Notice: Subject to any disclaimer, the term of this patent is extended or adjusted under 35 U.S.C. 154(b) by 0 days.

(21) Appl. No.: 09/732,806

(22) Filed: Dec. 7, 2000

Related U.S. Application Data

(63) Continuation of application No. 09/342,892, filed on Jun. 29, 1999, now Pat. No. 6,169,626.

(51) Int. Cl.$^7$ .................................................. G02F 1/01
(52) U.S. Cl. ..................... 359/279; 359/237; 359/618; 385/2; 385/27
(58) Field of Search ........................ 359/279, 237, 359/618, 629, 238, 239; 385/2, 3, 8, 27

(56) References Cited

U.S. PATENT DOCUMENTS 6,125,220 * 9/2000 Copner et al. ...................... 385/27

* cited by examiner

*Primary Examiner*—Georgia Epps
*Assistant Examiner*—Timothy Thompson
(74) *Attorney, Agent, or Firm*—Lacasse & Associates; Randy W. Lacasse; Kevin E. Greene

(57) ABSTRACT

An interleaver and a deinterleaver for filtering optical signals are described. The interleaver separates subsets of channels. The deinterleavers mix subsets of channels. Interleavers and deinterleavers can be used to increase the bandwidth of an optical network. The interleavers and deinterleavers can be used to interface components designed for a first channel spacing to components designed for a second channel spacing.

29 Claims, 13 Drawing Sheets

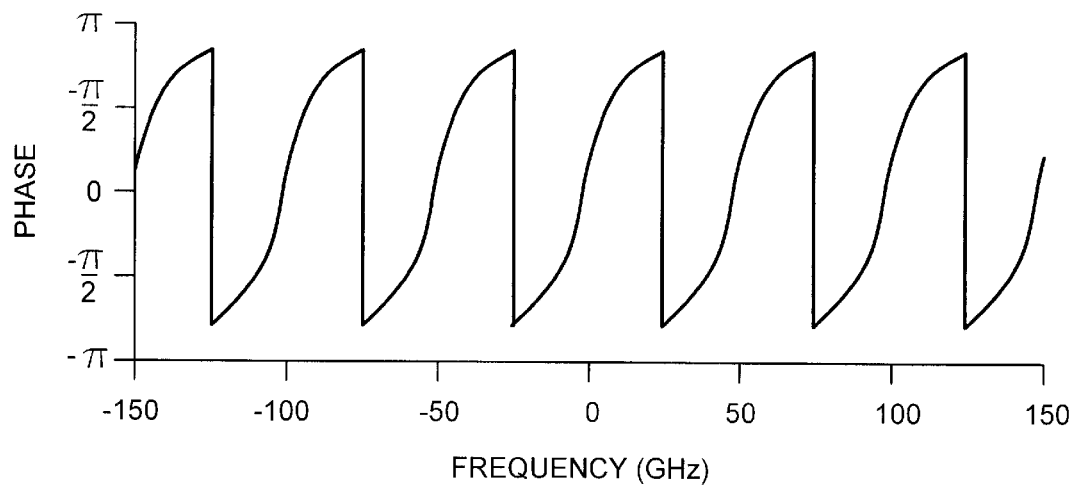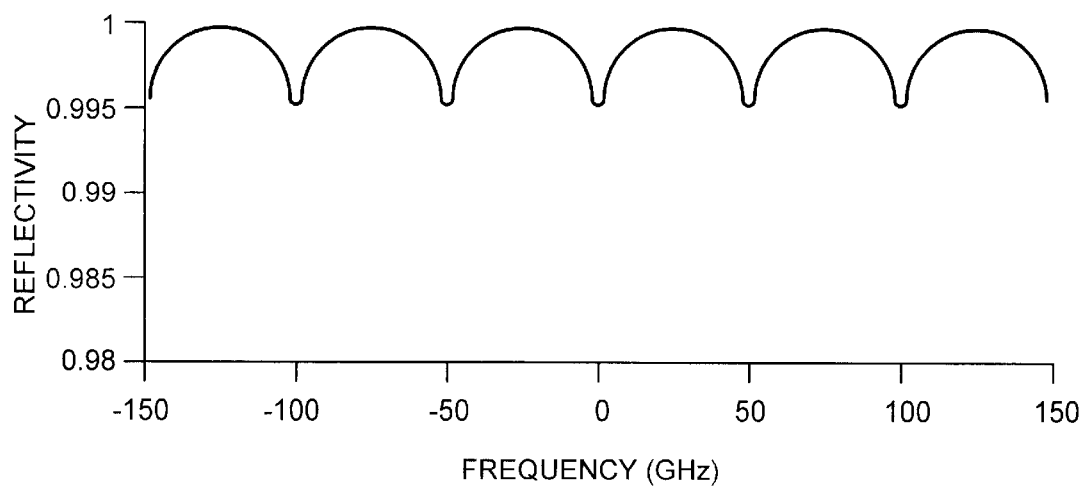
FIG. 2

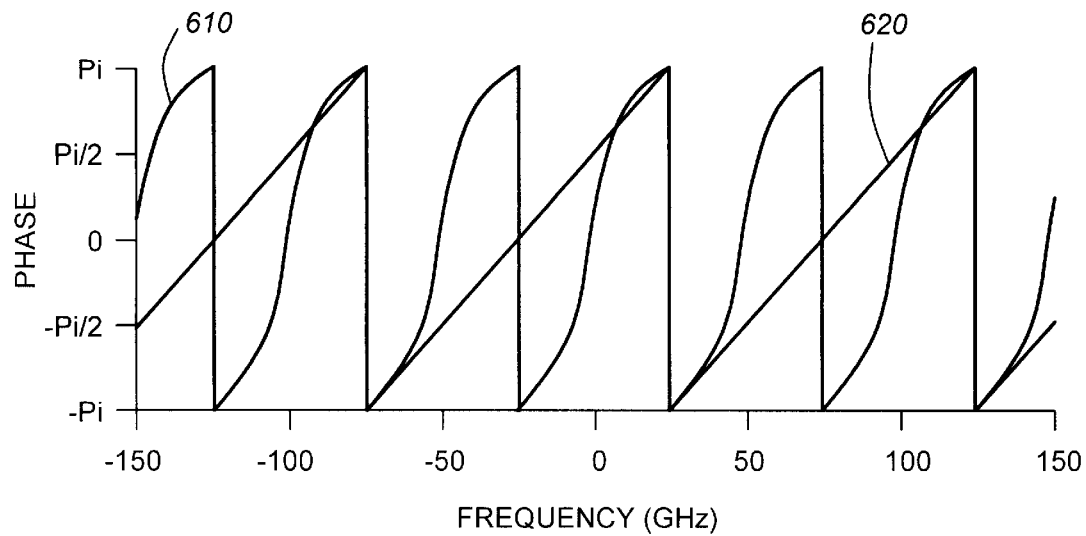
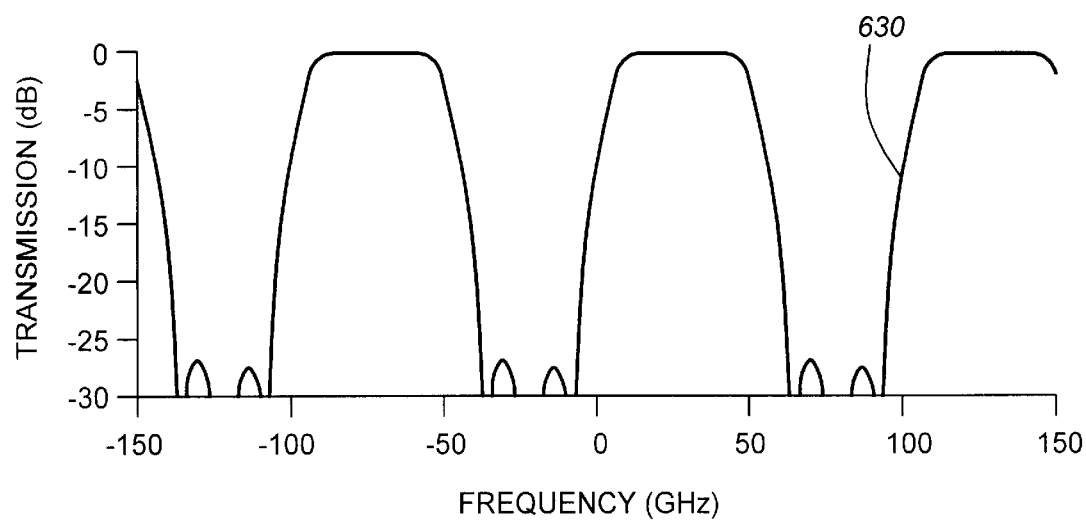
FIG. 6

OPTICAL SIGNAL INTERLEAVER/DEINTERLEAVERS

This application is a continuation of U.S. patent application Ser. No. 09/342,892, filed Jun. 29, 1999 now U.S. Pat. No. 6,169,626.

FIELD OF THE INVENTION

The invention relates to optical signal communications. More particularly, the invention relates to an interleaver for use with multiple optical channels.

BACKGROUND OF THE INVENTION

As telecommunications usage increases as a result of, for example, increased Internet usage, increased types of communications, population growth, etc., telecommunications providers are required to provide greater voice- and data-carrying capacity. In order to reduce cost and the amount of time required to provide the increased capacity, wavelength division multiplexing (WDM) and dense wavelength division multiplexing (DWDM) have been developed, which provide increased capacity without requiring new fiber optic cables.

WDM and DWDM technologies combines multiple optical signals into a single fiber by transporting each signal on a different optical wavelength or channel. Multiplexing and demultiplexing of optical channels is typically accomplished with thin film optical filters. However, multiple layers of film are required to multiplex and demultiplex multiple channels, which increases the cost and complexity of a component. Another disadvantage of multiple layers of thin film for filtering is that the thin films break down over time, especially when operating under high power conditions.

Another approach to increasing fiber optic capacity is to use more closely spaced channels. For example, at one point in time, 200 GHz spacing was common for optical channels. At that time optical components were designed to operate on 200 GHz spaced channels. As the state of the art improved, 100 GHz spacing was used for optical channels. Optical components were then designed to operate on 100 GHz spaced channels and devices designed to operate on 200 GHz spaced channels had to be replaced of modified to operate on the 100 GHz spaced channels. This upgrade requirement can be very expensive for parties with extensive fiber optic equipment.

Similar upgrade requirements apply to other channel spacing changes (e.g., 100 GHz spacing to 50 GHz spacing). What is needed is an optical device that can be used for interfacing between different channel spacing schemes.

SUMMARY OF THE INVENTION

An interleaver and a deinterleaver for filtering optical signals is described. In one embodiment, an interleaver includes a beam splitter to split an input optical beam into a first sub-beam and a second sub-beam. The interleaver also includes an etalon coupled to receive the first sub-beam. The etalon has a reflective surface and an air gap, the reflective surface reflects signals passed through the air gap. The interleaver further includes a non-linear phase shifter coupled to receive the second sub-beam. The phase shifter modifies a phase of the second sub-beam. the modified phase of the second sub-beam causes constructive and destructive optical interference between the reflected first sub-beam and the reflected second sub-beam to cause a first subset of signals from the input optical beam to be directed to a first port and the second subset of signals from the input optical beam to be directed to a second port.

In one embodiment, a deinterleaver includes a circulator. A first deinterleaver component is optically coupled to the circulator. The first interleaver component has a first port optically coupled to the circulator, a beam splitter to split the input optical beam into a first sub-beam and a second sub-beam, an etalon coupled to receive the first sub-beam, the etalon having a reflective surface and an air gap, the reflective surface to reflect signals passed through the air gap, and a non-linear phase shifter coupled to receive the second sub-beam. The phase shifter modifies a phase of the second sub-beam. The modified phase of the second sub-beam causes constructive and destructive optical interference between the reflected first sub-beam and the reflected second sub-beam to cause a first subset of signals from the input optical beam to be directed to the first port and the second subset of signals from the input optical beam to be directed to an output port.

The deinterleaver also includes a second deinterleaver component optically coupled to the circulator. The second interleaver component has a first port optically coupled to the circulator to receive the first subset of signals from the circulator, a beam splitter to split the first subset of signals into a first sub-beam and a second sub-beam, an etalon coupled to receive the first sub-beam. The etalon has a reflective surface and an air gap. The reflective surface to reflect signals passed through the air gap. The second interleaver component also includes a non-linear phase shifter coupled to receive the second sub-beam. The phase shifter modifies a phase of the second sub-beam. The modified phase of the second sub-beam causes constructive and destructive optical interference between the reflected first sub-beam and the reflected second sub-beam to cause the first subset of signals from the input optical beam to be directed to an output port.

BRIEF DESCRIPTION OF THE DRAWINGS

The invention is illustrated by way of example, and not by way of limitation in the figures of the accompanying drawings in which like reference numerals refer to similar elements.

FIG. 2 is the phase and intensity response of reflected light from a FPPS as illustrated in FIG. 1.

FIG. 6 is the phase and intensity response of an ideal interleaver as illustrated in FIG. 5.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

An interleaver and a deinterleaver for filtering optical signals are described. The interleaver separates subsets of channels. The deinterleavers mix subsets of channels. Interleavers and deinterleavers can be used to increase the bandwidth of an optical network. The interleavers and deinterleavers can be used to interface components designed for a first channel spacing to components designed for a second channel spacing.

Figure 1:
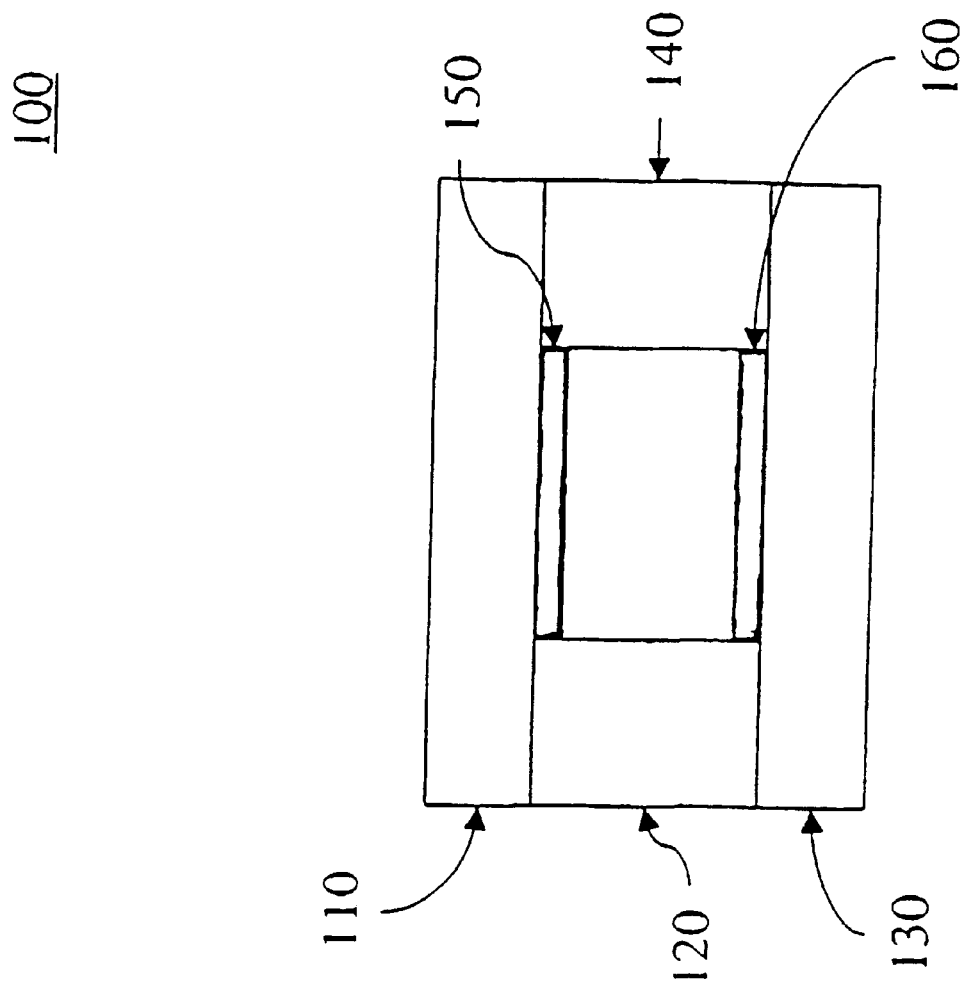
FIG. 1 illustrates one embodiment of a Fabry-Perot Phase Shifter.

FIG. 1 illustrates one embodiment of a Fabry-Perot Phase Shifter. As illustrated in FIG. 1, a Fabry-Perot Phase Shifter (FPPS) 100 is a one-sided Fabry-Perot etalon having partially reflective front material 160 and highly reflective back material 150. As described in greater detail below, the phase and intensity response of FPPS 100 is wavelength dependent.

In one embodiment, FPPS 100 includes front plate 130, back plate 110, and spacers 120 and 140. FPPS 100 also includes front reflective material 160 and back reflective material 150. In one embodiment, front plate 130 and back plate 110 are glass plates and spacers 120 and 140 are made of ultra-low expansion (ULE) material.

In one embodiment, front reflective material 160 has a reflectivity in the range of 10% to 25% reflective (e.g., 15±1%, 19.6%); however, front reflective materials having other reflectivities can also be used. Thus, front reflective material 160 reflects 10% to 25% of the optical signal that passes through front glass plate 130. The remaining 75% to 90% of the signal is passed through front reflective material 160 through the gap between front reflective material 160 to back reflective material 150.

In one embodiment, the gap between front glass plate 130 and back glass plate 110 is air filled. Having an air gap in FPPS 100 allows FPPS 100 to operate on high power signals without thermal expansion or other thermal effects because the signals pass through air rather than the materials of FPPS 100. In one embodiment, back reflective material 150 is 90% to 100% reflective (e.g., 99.8%). Thus, back reflective material 150 reflects substantially all of the optical signals passed by front reflective material 160. The light reflected by back reflective material 150 is passed back through front reflective material 160 and front plate 130.

FIG. 2 is the phase and intensity response of reflected light from a FPPS as illustrated in FIG. 1. The FPPS having a response as illustrated in FIG. 2 has a front reflectivity of 19.6% and a back reflectivity of 99.8%. Other front and back reflectivities can be used to provide other phase and intensity responses.

As illustrated in FIG. 2, the FPPS provides phase modulation with some attenuation. Because the phase and intensity response of a FPPS is wavelength dependent, certain frequencies are attenuated more than other frequencies. However, the attenuation provided by the FPPS is not sufficient to provide channel filtering.

Figure 3:
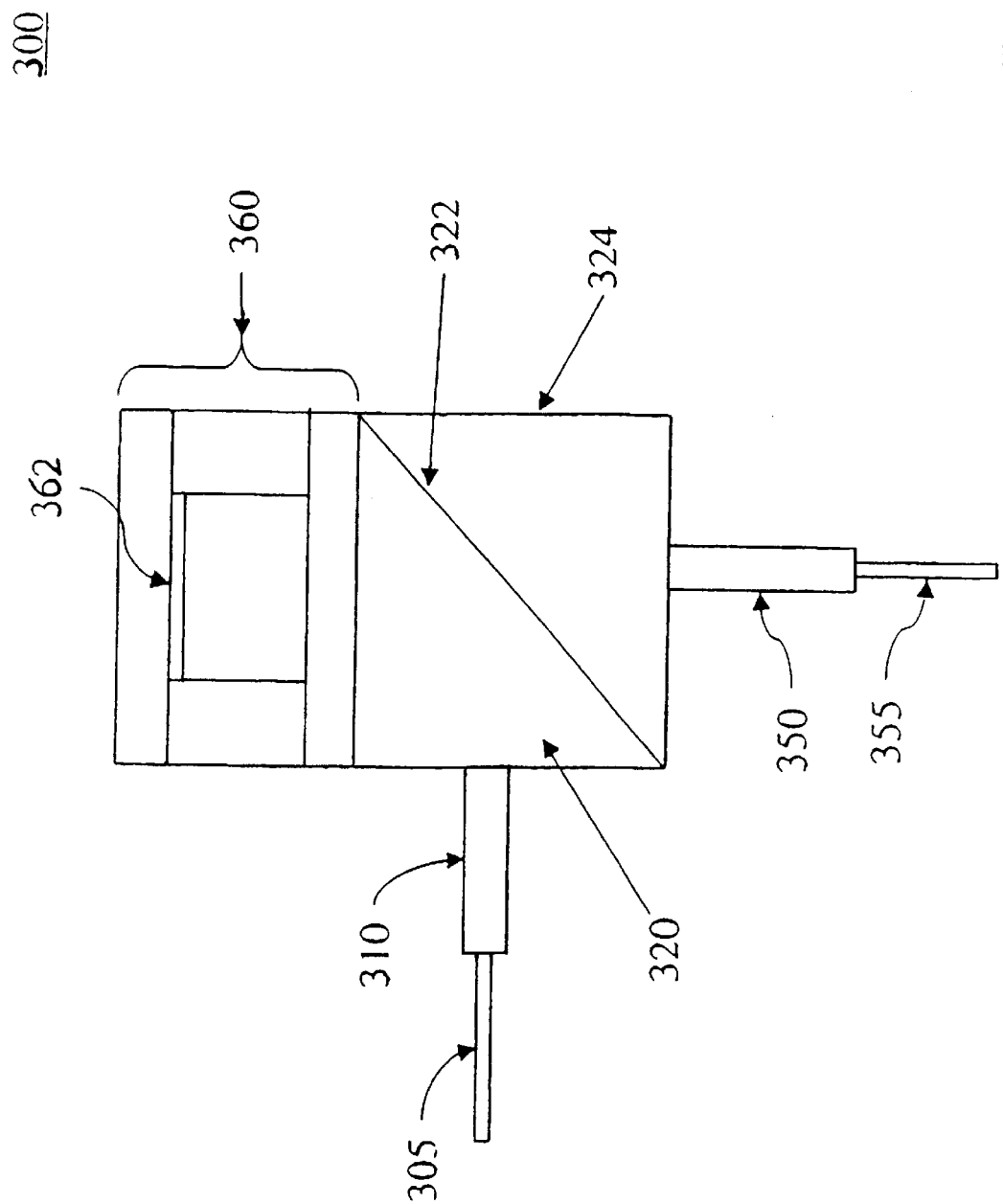
FIG. 3 illustrates one embodiment of an unequal path Michelson interferometer.
Figure 4:
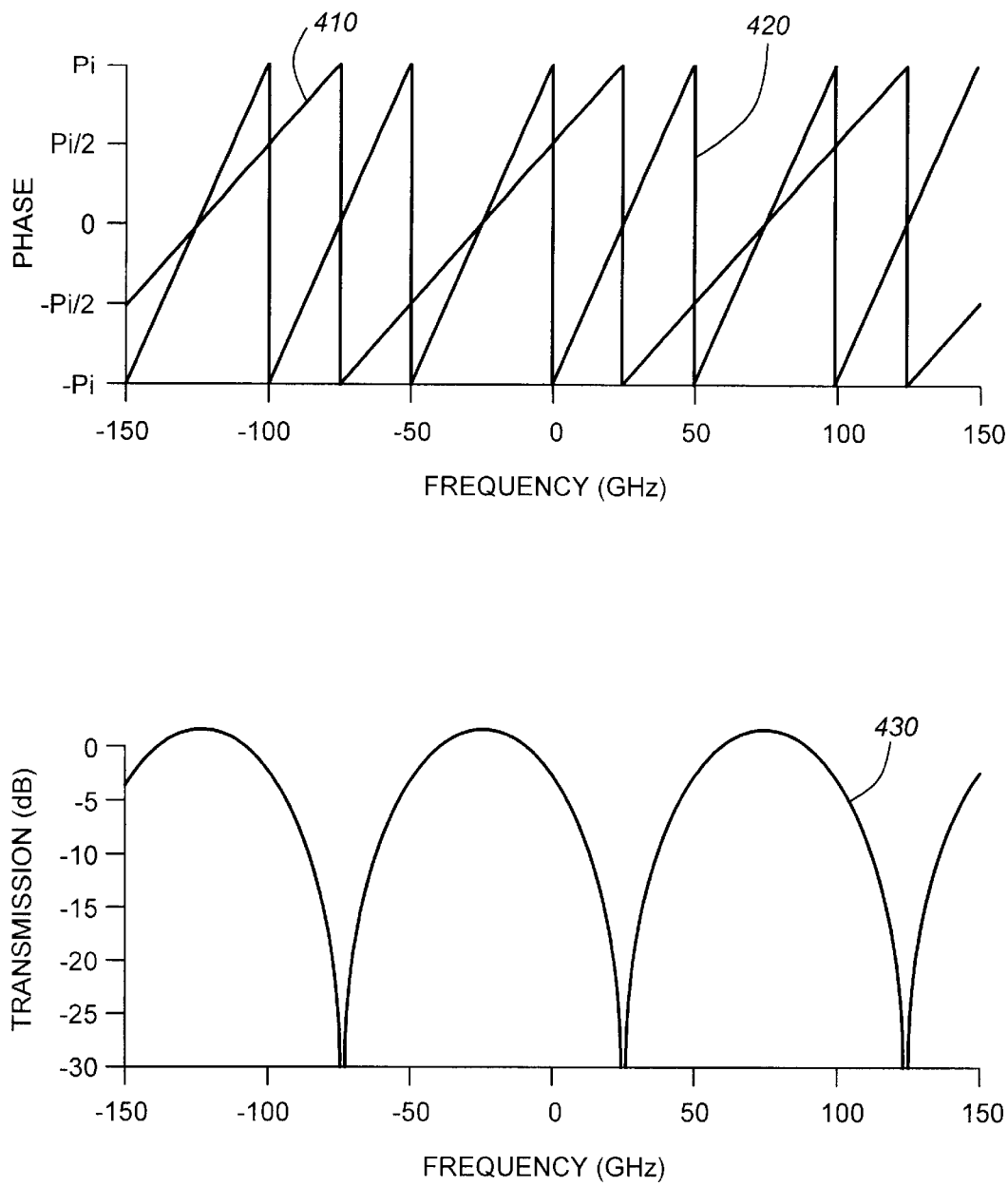
FIG. 4 is the phase and intensity response of reflected light from an unequal path Michelson interferometer as illustrated in FIG. 3.

FIG. 3 illustrates one embodiment of an unequal path Michelson interferometer. As illustrated in Figure 4 below, the phase response is linear, which does not provide sufficient pass bands and rejection bands to filter optical signals.

Optical fiber 305 receives, from an external source, optical signals corresponding to one or more frequencies. Collimator 310 collimates the optical signals and passes the optical signals to beam splitter cube 320. Other types of beam splitters, for example, mirror beam splitters can also be used. Beam splitter cube 320 splits the beam received via optical fiber 305 and collimator 310 into a first sub-beam and a second sub-beam.

The first sub-beam is reflected by beam splitter cube interface 322 to etalon 360. Etalon 360 includes reflecting surface 362 that reflects the first sub-beam to collimator 350. In one embodiment, etalon 360 also includes a front reflecting surface (not shown in FIG. 3). The second sub-beam passes through beam splitter cube interface 322 to back surface 324. The second sub-beam is reflected by back surface 324 to beam splitter cube interface 322, which reflects the second sub-beam to collimator 350.

Constructive and destructive light interference between the first sub-beam and the second sub-beam at beam splitter cube interface 322 cause the output signal to vary between being at or near full input strength to being greatly attenuated. The combined output signal is carried by optical fiber 355.

FIG 4 is the phase and intensity response of reflected light from an unequal path Michelson interferometer as illustrated in FIG. 3. Phase lines 410 and 420 represent the phase of the two sub-beams generated by beam splitter 320 of FIG. 3 for a range of frequencies. Phase line 410 corresponds to the phase of the first sub-beam that passes through etalon 360. Phase line 420 corresponds to the phase of the second sub-beam. Transmission line 430 represents the transmission strength of the output signal of FIG. 3 for a range of frequencies.

The transfer function of the unequal path Michelson interferometer is a function of $\sin^2 \Delta\phi$ of the phase difference between the two paths (or arms), $\Delta\phi = \phi_1 - \phi_2$, where $\phi_1$ and $\phi_2$ are the phase of the first path and the second path, respectively. If the lengths of the first and second paths are, for example, L and 2L, respectively, then $\phi_1 = 2kL$, $\phi_2 = 4kL$, and $\Delta\phi = 2kL - 2m\pi$.

Thus, $\Delta\phi$ is periodic and linear (within the $2\pi$ range) in optical frequency and the spectral transfer function is sinusoidal in optical frequency. In other words, the unequal path Michelson interferometer provides periodic transmission and attenuation characteristics. However, the unequal path Michelson interferometer does not provide enough flat-band transmission bandwidth for transmission channels or enough bandwidth for sufficient adjacent channel isolation.

Figure 5:
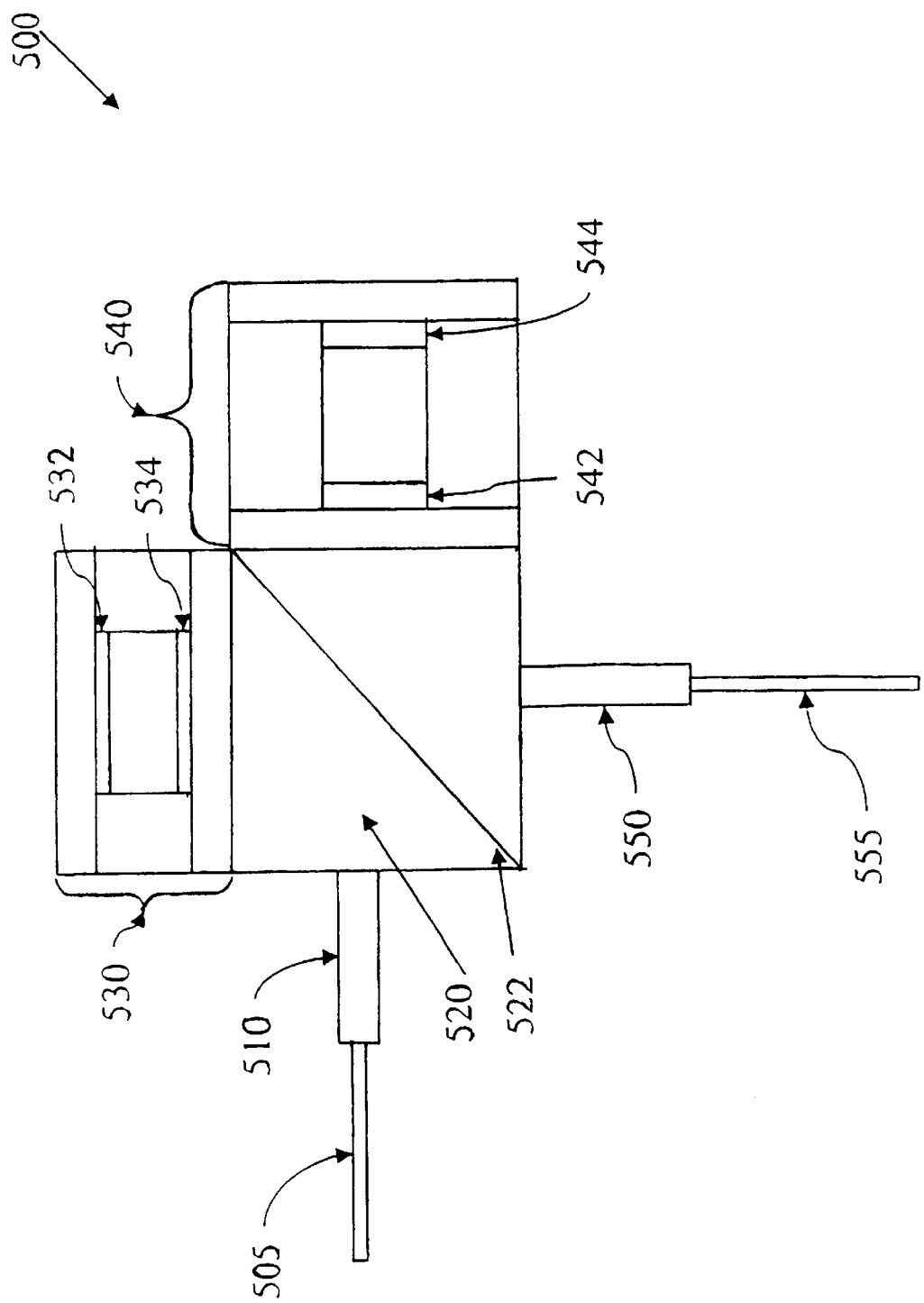
FIG. 5 illustrates one embodiment of an interleaver/deinterleaver.

FIG. 5 illustrates one embodiment of an interleaver/deinterleaver. When operating as an interleaver, ideal interleaver/deinterleaver 500 receives a set of optical signals, for example, optical channels as defined by the International Telecommunications Union (ITU), via optical fiber 505 and collimator 510.

As described in greater detail below, an interleaver configuration as described herein can be used to separate sets of optical channels, for example, even and odd channels can be separated. Separation of even and odd channels is useful, for example, for interfacing devices designed for one channel spacing (e.g., 200 GHz) with devices designed for a different channel spacing (e.g., 100 GHz). Thus, devices and/or networks can be upgraded without requiring that all devices be upgraded, or network bandwidth can be increased. A deinterleaver can be used to combine sets of channels (e.g., even channels and odd channels) into a single set of channels.

Beam splitter cube 520 splits the optical signal into a first sub-beam and a second sub-beam. In one embodiment, beam splitter cube 520 splits the beam evenly such that each etalon receives a 50% strength version of the input signal. In other words, beam splitter cube 520 is a 50-50 beam splitter. Other types of beam splitters can also be used. Because a precise 50-50 beam splitter is difficult to manufacture, other beam splitting ratios can also be used. One embodiment of an interleaver with beam splitters that are not 50-50 beam splitters is described in greater detail below.

Assuming a 50-50 beam split by beam splitter cube 520, the first sub-beam is directed to etalon 530 and the second sub-beam is directed to FPPS 540. The first sub-beam is reflected by beam splitter cube interface 522 and directed to etalon 530. In one embodiment, front reflective material 534 reflects 0% to 10% of the signal directed to etalon 530 by beam splitter cube 520. In one embodiment, the gap between front reflective material 534 and back reflective material 532 is 0.75 mm; however, other gap sizes can also be used. Back reflective material 532 is reflects 90% to 100% of the signal passed by front reflective material 534. The reflected first sub-beam is passed by beam splitter cube interface 522 to collimator 550.

The second sub-beam is passed beam splitter cube interface 522 to FPPS 540. In one embodiment, front reflective material 542 reflects 15% to 20% of the second sub-beam directed to FPPS 540 by beam splitter cube 520. In one embodiment the gap between front reflective material 542 and back reflective material 544 is 1.5 mm; however, other gap sizes can also be used. Back reflective material 544 reflects 90% to 100% of the signal passed by front reflective material 542. The reflected second sub-beam is directed to beam splitter cube interface 522 and reflected to collimator 550.

Etalon 530 provides a linear phase difference and a sinusoidal transfer function, as described above with respect to FIG. 4, for the first sub-beam. FPPS 540 provides a non-linear phase response with slight attenuation, as described above with respect to FIG. 2, for the second sub-beam. The phase and intensity response of etalon 530 and FPPS 540 cause constructive and destructive light interference at beam splitter cube interface 522. The frequencies for which constructive light interference occurs are passed at or near full intensity. The frequencies for which destructive light interference occurs results in attenuation of the optical signal.

When operating as a deinterleaver, ideal interleaver/deinterleaver 500 receives a first set of optical channels (e.g., even channels) via optical fiber 555 and a second set of optical channels (e.g., odd channels) via optical fiber 505. Ideal interleaver/deinterleaver 500 operates to pass the first set of optical channels from optical fiber 555 to optical fiber 505 and reflect the second set of optical channels from optical fiber 505 back to optical fiber 505.

Because even and odd channels have a frequency spacing that is double the frequency spacing for the combined set of channels, interleavers and deinterleavers can be used to interface devices designed for different channel spacings. For example, in a 100 GHz spaced scheme, the odd channels are spaced by 200 GHz and the even channels are spaced by 200 GHz. By separating the even and odd channels, devices that are designed to operate with 200 GHz spaced channels can interface with 100 GHz spaced devices. Other frequency ratios (e.g., 100 GHz, 50 GHz) can be similarly interfaced.

FIG. 6 is the phase and intensity response of an interleaver as illustrated in FIG. 5. By combining an FPPS and a Michelson interferometer, a periodic non-linear phase response can be achieved. As a result, the flat-band bandwidth can be provided. Also, enough bandwidth with large isolation necessary to isolate optical channels is provided.

Phase line 610 corresponds to the phase of the first sub-beam that is directed to etalon 530 as a function of frequency. Phase line 620 corresponds to the phase of the second sub-beam that is directed to FPPS 540 as a function of frequency. Transmission line 630 indicates transmission intensity of optical signals output by the interleaver as a function of frequency.

When phase lines 610 and 620 are in phase or 180° out of phase, the interleaver transmits the optical signals at or near full intensity. As phase lines 610 and 620 become out of phase with respect to each other the intensity of the optical signals decreases and the signal is attenuated. Because phase line is periodic and non-linear, transmission line 630 indicates regularly spaced frequencies corresponding to relatively wide, flat pass bands.

Transmission of the optical signals at or near full intensity occurs when the two sub-beams are in phase or are 180° out of phase because of constructive light interference at beam splitter cube interface 522. When the two sub-beams are out of phase, destructive interference at beam splitter cube interface 522 causes the two sub-beams to cancel each other, which results in attenuation of the original optical signal.

Figure 7:
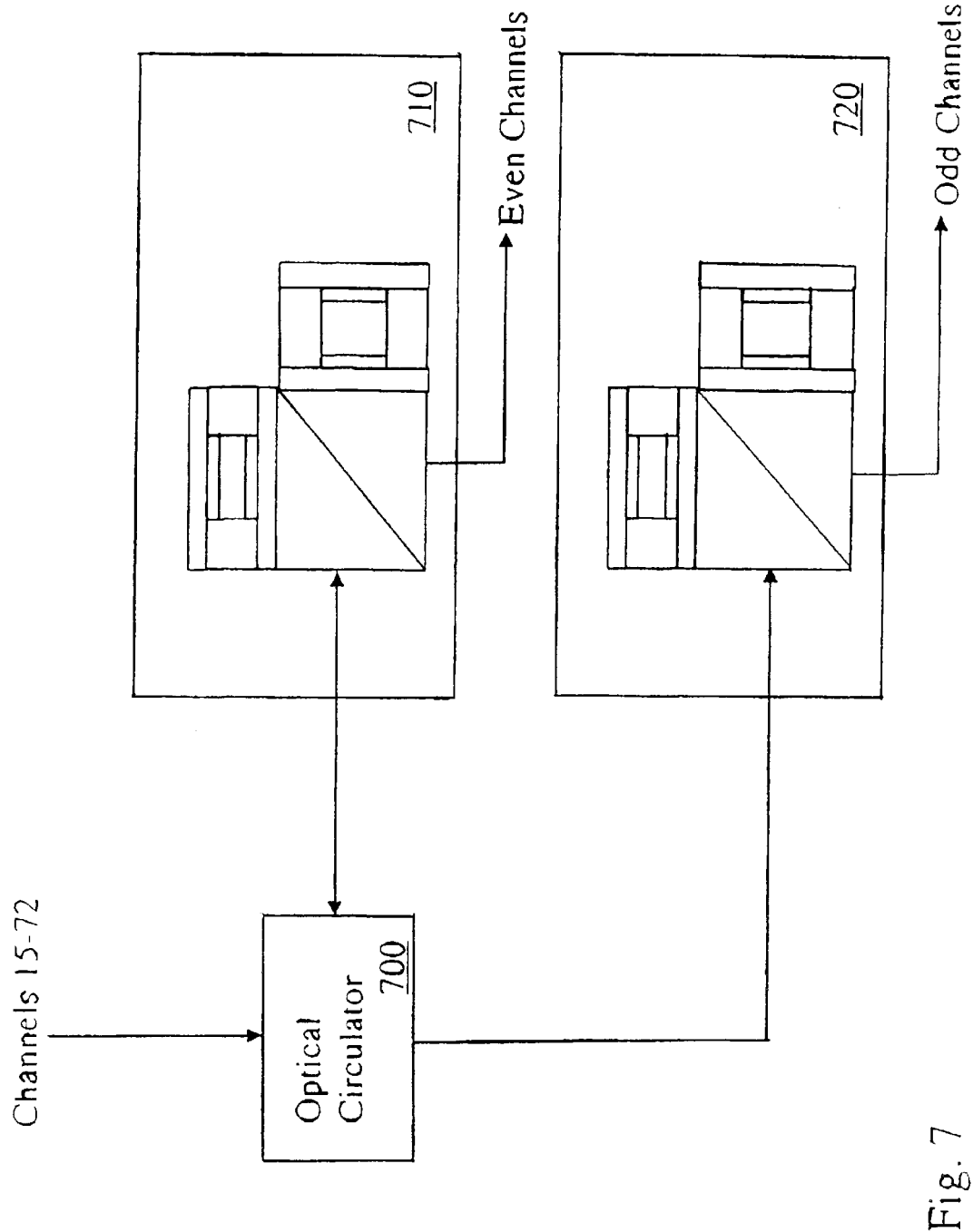
FIG. 7 illustrates one embodiment of an optical deinterleaver device.

FIG. 7 illustrates one embodiment of an optical deinterleaver device. Optical circulator 700 receives a set of optical channels (e.g., ITU channels 15–72) according to a WDM or DWDM scheme. Optical circulator 700 directs the set of optical channels to deinterleaver component 710. In the embodiment of FIG. 7, the beam splitter cubes are not 50-50 beam splitters. Because 50-50 beam splitter cubes are difficult and expensive to manufacture, two deinterleaver components providing greater transmission than reflection can be used to provide an optical deinterleaver device.

In one embodiment deinterleaver component 710 is a Michelson-type deinterleaver as described in greater detail above with respect to FIG. 5; however, Mach-Zehnder deinterleavers, which are described in greater detail below, or other deinterleaver components can also be used.

In one embodiment, deinterleaver component 710 passes the even channels and reflects the odd channels. The odd channels are reflected back to optical circulator 700. Optical circulator 700 directs the odd channels to deinterleaver component 720. Deinterleaver component 720 reflects the even channels and passes the odd channels to further filter the optical signals.

Figure 8:
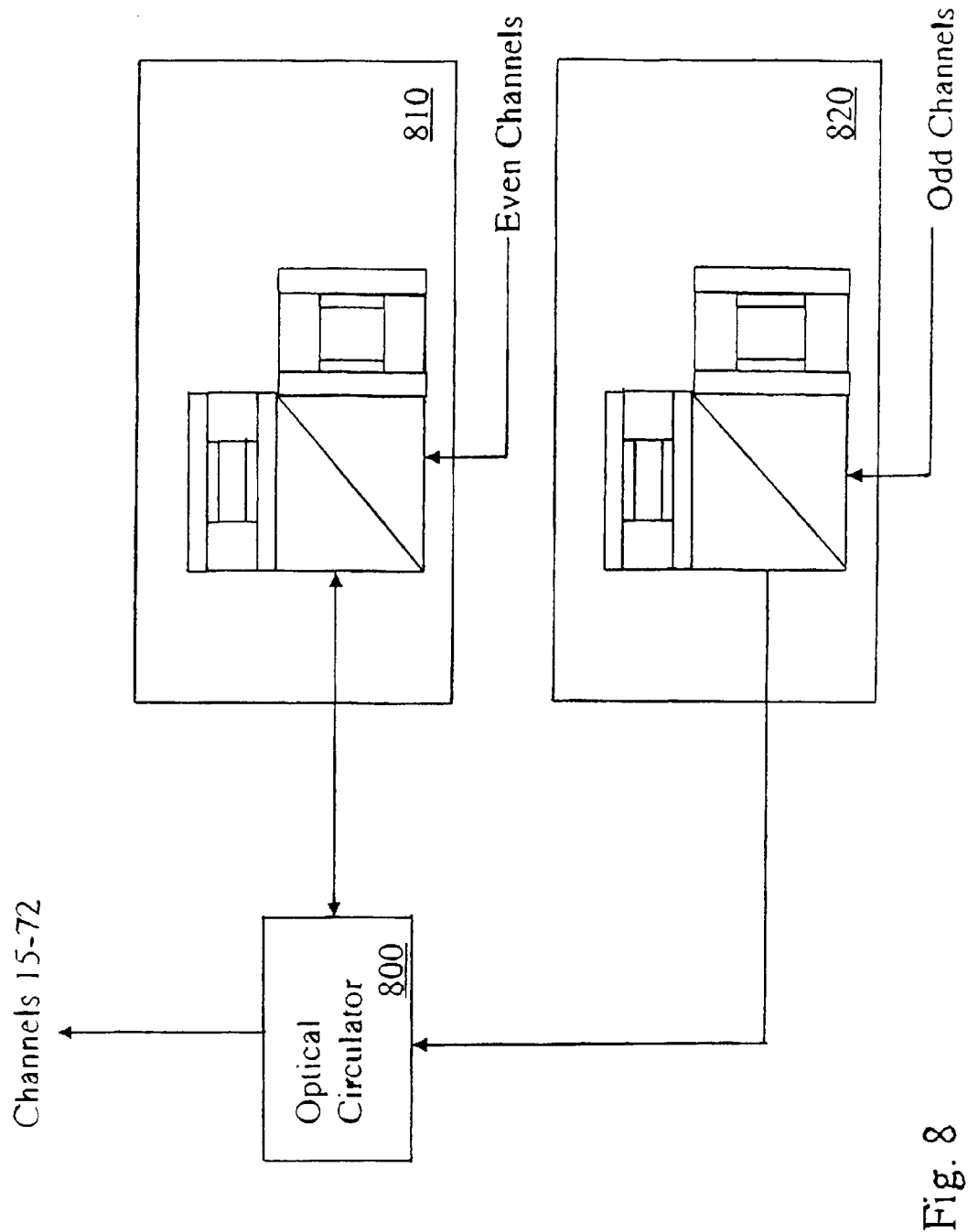
FIG. 8 illustrates one embodiment of an optical interleaver device.

FIG. 8 illustrates one embodiment of an optical interleaver device. The interleaver device of FIG. 8 combines a set of even channels and odd channels to provide a set of channels having both even and odd channels. The example of FIG. 8 is described in terms of ITU channels 15–72; however, any number or sets of channels can be used.

Odd channels are input to interleaver component 820. The odd channels are passed by interleaver component 820 and communicated to optical circulator 800. Optical circulator 800 directs the odd channels to interleaver component 810. Interleaver component 810 also receives even channels. Interleaver component 810 combines the even and odd channels. The set of even and odd channels are directed to optical circulator 800, which outputs the set of even and odd channels (e.g., ITU Channels 15–72).

Figure 9:
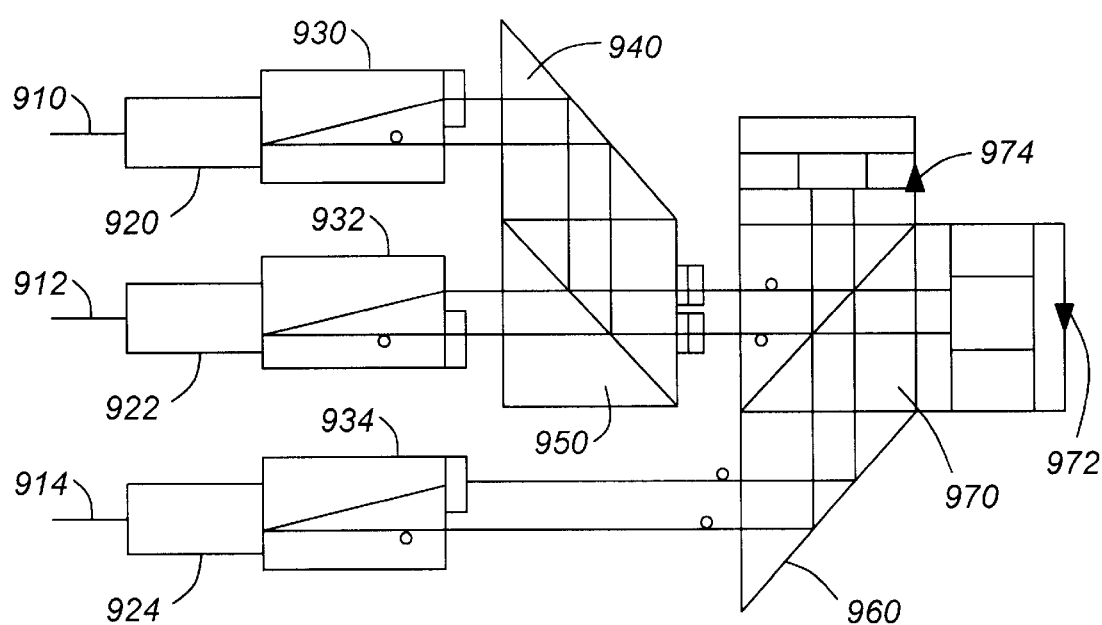
FIG. 9 illustrates one embodiment of an integrated interleaver/deinterleaver device.

FIG. 9 illustrates one embodiment of an integrated interleaver/deinterleaver device. When operating as a deinterleaver, integrated interleaver/deinterleaver 900 is a three port device that receives a set of optical signals including even channels and odd channels though one input port and provides a set of odd channel signals through one output port and a set of even channel signals through another output port.

Optical fiber 912 carries a set of optical signals having even and odd channels from an external source (not shown in FIG. 9). Collimator 922 collimates the signals received from optical fiber 912. Walk-off crystal 932 separates the signals from collimator 922 into vertically polarized and horizontally polarized signals. Half-wave plate 982 rotates the vertically polarized signal to a horizontally polarized signal.

Polarization beam splitter 950 passes both horizontally polarized signals to quarter wave plate and garnet combination 990 and 992, which rotate the horizontally polarized signals to vertically polarized signals. Beam splitter cube 970, etalon 974 and FPPS 972 operate on the vertically polarized signals as described above to separate the signals into even and odd channels. In one embodiment beam splitter cube 970, etalon 974 and FPPS 972 reflect odd channels and transmit even channels; however, even channels can be reflected and odd channels can be transmitted.

Assuming for purposes of explanation that odd channels are reflected and even channels are transmitted, the odd channels are reflected back to quarter wave plate and garnet combination 990 and 992, which rotates the vertically polarized signals to horizontally polarized channels. Polarization beam splitter 950 reflects the horizontally polarized signals to Prism 940.

Prism 940 reflects one beam to half wave plate 980, which rotates the beam to generate a vertically polarized signal that is passed to walk off crystal 930. The second beam is reflected directly to walk off crystal 930. Walk off crystal 930 combine the vertically polarized signal and the horizontally polarized signal to provide an output signal carrying the odd channels to collimator 920. Collimator 920 focuses the output signal on optical fiber 910.

The even channels are transmitted by beam splitter 970, etalon 974 and FPPS 972 to prism 960. Prism 960 reflects one beam to half wave plate 984, which rotates the vertically polarized signal to provide a horizontally polarized signal. The second beam is reflected directly to walk off crystal 934. Walk off crystal 934 combines the horizontally polarized signal and the vertically polarized signal to provide an output signal carrying the even channels to collimator 924. Collimator focuses the output signal on optical fiber 914.

When operating as an interleaver, integrated interleaver/deinterleaver 900 receives a set of even channel signals through an input port and a set of odd channel signals though another input port, and provides a set of signals including the even channels and the odd channels through an output port.

In one embodiment integrated interleaver/deinterleaver 900 receives even channels from optical fiber 914 and odd channels from optical fiber 910. An output signal having both the even and the odd channels is output to optical fiber 912. The even channels received from optical fiber 914 are collimated by collimator 924. The collimated signal is separated into vertically polarized and horizontally polarized signals by walk off crystal 934.

In one embodiment, the horizontally polarized signal is rotated by half wave plate 984 such that prism 960 receives two horizontally polarized signals. The horizontally polarized signals are reflected to beam splitter 970, etalon 974 and FPPS 972.

The odd channels are received via optical fiber 910 and collimated by collimator 920. The collimated signal is separated into a horizontally polarized beam and a vertically polarized beam by walk off crystal 930. Half wave plate 980 rotates the vertically polarized beam to a horizontally polarized beam. The two horizontally polarized beams are reflected by prism 940 to polarization beam splitter 950. Polarization beam splitter 950 directs the beams carrying the odd channels to beam splitter 970, etalon 974 and FPPS 972. The combination of beam splitter 970, etalon 974 and FPPS 972 combines the even channels with the odd channels as described in greater detail above.

The combined signal having both even and odd channels is passed to polarization beam splitter 950 through garnet and quarter wave plate combination 990 and 992. The combined signal is passed by polarization beam splitter 950. One beam is directed to half wave plate 982, which rotates the signal and passes the signal to walk off crystal 932. The second beam is directed to walk off crystal 932. Walk off crystal 932 combines the two beams to provide an output signal to collimator 922. Collimator 922 focuses the output signal on optical fiber 912.

Figure 10:
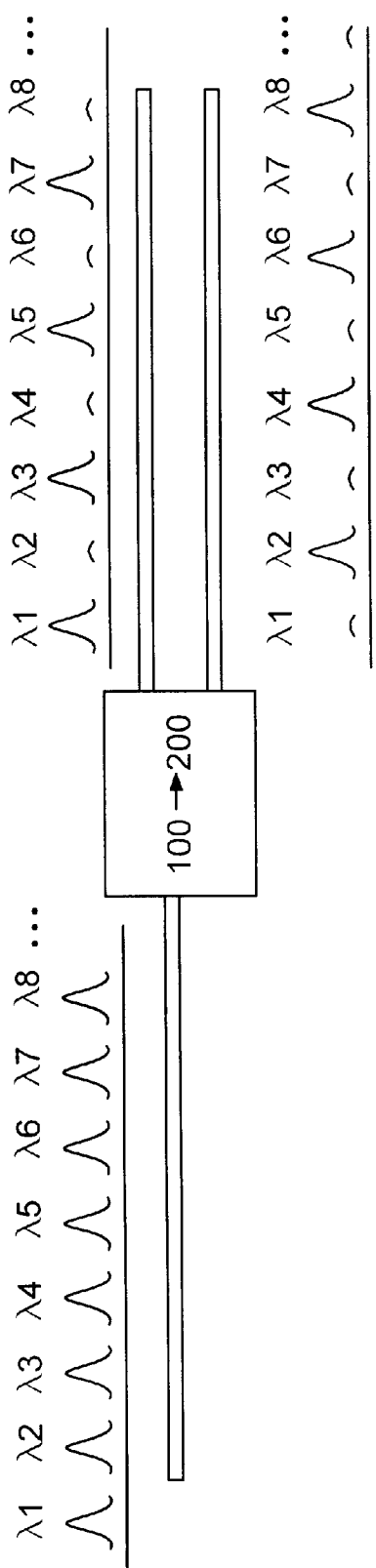
FIG. 10 is a conceptual illustration of a conversion from an optical channel scheme having 100 GHz spacing to an optical channel scheme having 200 GHz.

FIG. 10 is a conceptual illustration of a conversion from an optical channel scheme having 100 GHz spacing to an optical channel scheme having 200 GHz. The conversion of FIG. 10 is useful, for example, to allow devices designed to operate with an optical channel scheme having 200 GHz channel spacing to interact with other devices or a network designed to operate with an optical channel scheme having 100 GHz channel spacing. Conversion between 100 GHz channel spacing and 200 GHz channel spacing allows, for example, network bandwidth to be increased without upgrading all of the devices that interact with the network.

In one embodiment, the converter of FIG. 10 is a deinterleaver as described above. After the signals are demultiplxed, the odd channels have a 200 GHz spacing and the even channels have a 200 GHz spacing. Recombining the even and the odd channels can be accomplished with the interleaver described above. The even and odd channels having 200 GHz spacing are combined (interleaved) into a signal stream having 100 GHz signal spacing. Similar interleaving can be provided to convert between 50 GHz spaced channels and 100 GHz spaced channels, as well as between other sets of channel spacing schemes.

Figure 11:
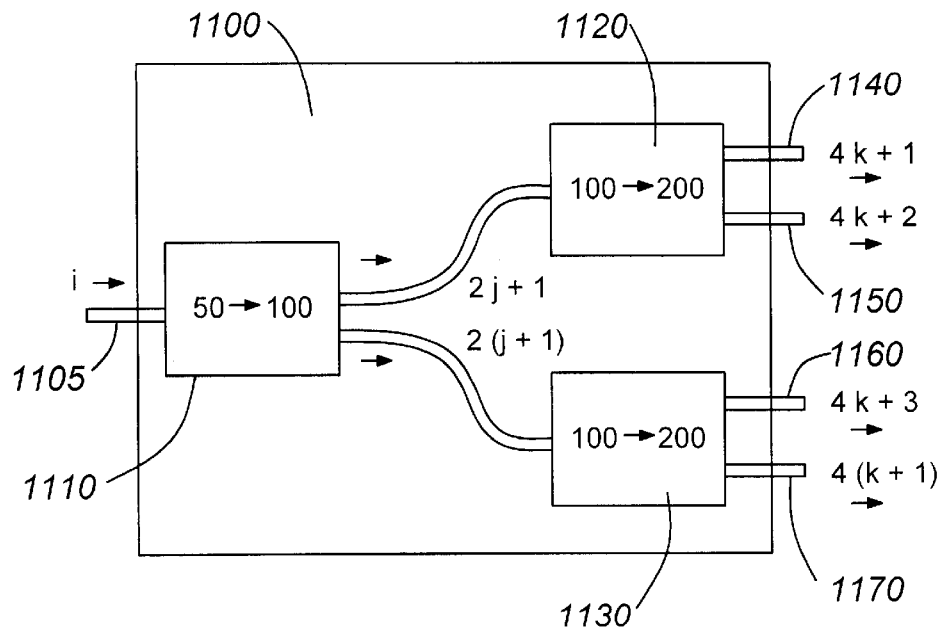
FIG. 11 is a block diagram of an optical deinterleaver for conversion from an optical channel scheme having 50 GHz spacing to an optical channel scheme having 200 GHz spacing.

FIG. 11 is a block diagram of an optical deinterleaver for conversion from an optical channel scheme having 50 GHz spacing to an optical channel scheme having 200 GHz spacing. In general, deinterleaver 1100 includes deinterleaver 1110 to convert from one set of 50 GHz spaced channels to two sets of 100 GHz spaced channels. Deinterleaver 1100 also includes two deinterleavers (1120 and 1130) each of which convert one of the sets of 100 GHz spaced channels to two sets of 200 GHz spaced channels. Deinterleaver 1100 allows devices designed for 200 GHz spaced channels to interact with devices or networks designed for 50 GHz spaced channels.

Optical fiber 1105 carries a set of optical channels (i) having 50 GHz spacing. Deinterleaver 1110 separates the set of optical channels into sets of even (2(j+1)) and odd (2j+1) channels. The even channels are input to deinterleaver 1130 and the odd channels are input deinterleaver 1120. The even and the odd channels have 100 GHz spacing.

Deinterleavers 1120 and 1130 operate to further separate the set of optical channels. Conceptually, deinterleaver 1120 and 1130 operate on the respective 100 GHz spaced channels to separate the input channels into "even" and "odd" channels. The sets of channels output by deinterleavers 1120 and 1130 have 200 GHz spacing.

Deinterleaver 1120 separates the odd channels into two sets of channels, odd-odd channels (4k+1) output by optical fiber 1140 and odd-even (4k+2) channels output by optical fiber 1150. Deinterleaver 1130 separates the even channels into two sets of channels, the even-odd (4k+3) channels output by optical fiber 1160 and the even-even (4(k+1)) channels output by optical fiber 1170.

The four sets of channels output by deinterleaver 1100 are 200 GHz spaced channels. Thus, deinterleaver 1100 can be used to interface one or more devices designed to operate on 200 GHz spaced channels with one or more devices or networks designed to operate on 50 GHz spaced channels. Other channel spacings can also be supported.

Figure 12:
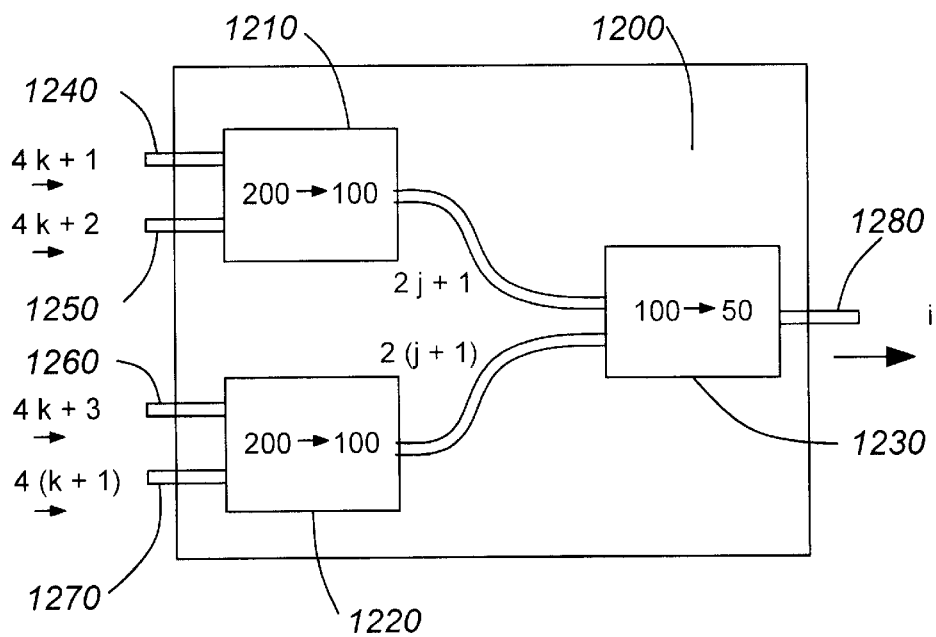
FIG. 12 is a block diagram of an optical interleaver for conversion from an optical channel scheme having 200 GHz spacing to an optical channel scheme having 50 GHz spacing.

FIG. 12 is a block diagram of an optical interleaver for conversion from an optical channel scheme having 200 GHz spacing to an optical channel scheme having 50 GHz spacing. In general, interleaver 1200 includes interleaver 1210 to convert from two sets of 200 GHz spaced channels to one set of 100 GHz spaced channels. Similarly, interleaver 1220 converts from two sets of 200 GHz spaced channels to one set of 100 GHz channels. Interleaver 1230 converts the two sets of 100 GHz spaced channels to one set of 50 GHz spaced channels. Interleaver 1200 allows devices designed for 200 GHz spaced channels to interact with devices or networks designed for 50 GHz spaced channels.

The odd-odd (4k+1) channels having 200 GHz spacing are input to interleaver 1210 via optical fiber 1240. The odd-even (4k+2) channels having 200 GHz spacing are input to interleaver 1210 via optical fiber 1250. Interleaver 1210 interleaves the odd-odd channels and the odd-even channels to generate a set of odd (2j+1) channels having 100 GHz spacing.

The even-odd (4k+3) channels having 200 GHz spacing are input to interleaver 1220 via optical fiber 1260. The even-even (4(k+1)) channels having 200 GHz spacing are input to interleaver 1220 via optical fiber 1270. Interleaver 1220 interleaves the even-odd channels and the even-even channels to generate a set of even (2(j+1)) channels having 100 GHz spacing.

Interleaver 1230 interleaves the even and odd channels to generate a set of channels (i) having 50 GHz spacing. Thus, interleaver 1200 allows devices designed to operate on optical channels having 200 GHz spacing to interact with devices designed to operate on optical channels having 50 GHz spacing. Other channels spacings can also be supported.

Figure 13:
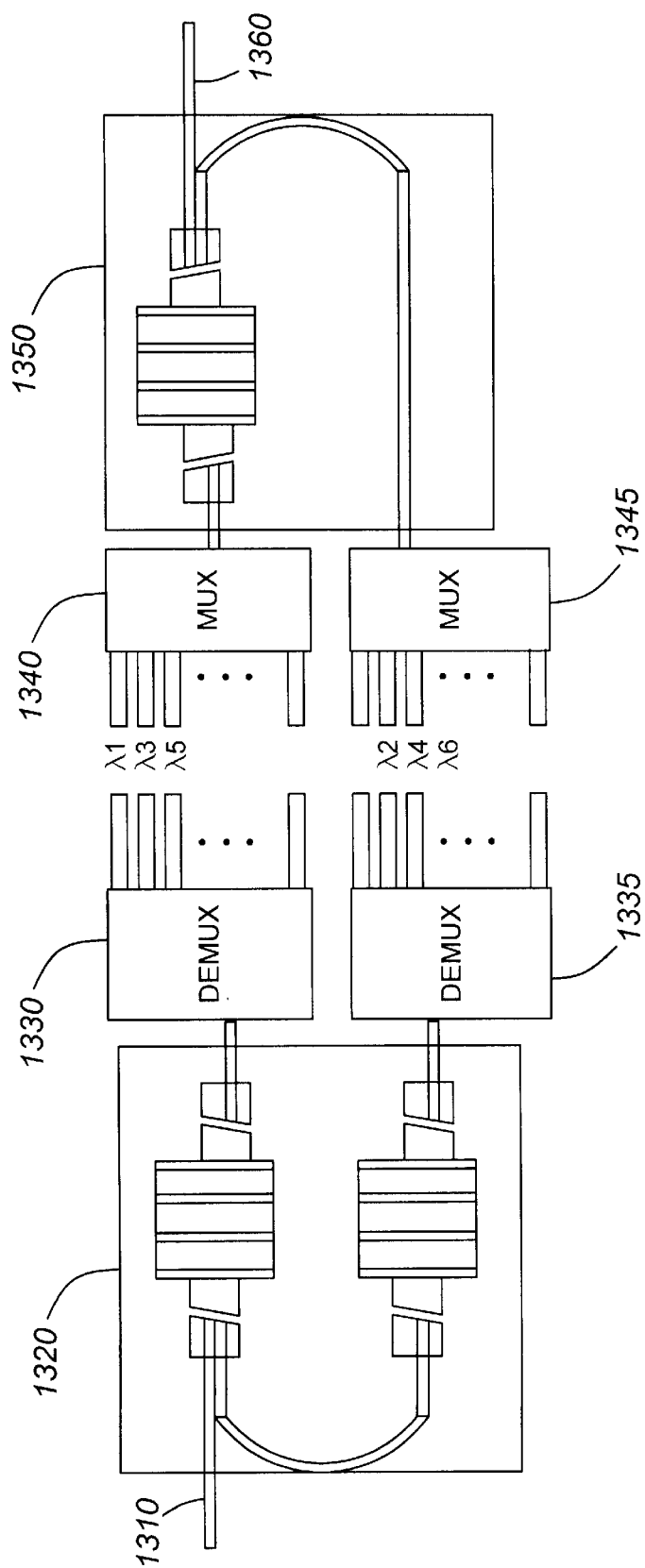
FIG. 13 illustrates one embodiment of an optical component configuration to increase the capacity of an optical network.

FIG. 13 illustrates one embodiment of an optical component configuration to increase the capacity of an optical network. While the embodiment of FIG. 13 is described as having a three-plate comb filters and a single layer of interleaving/deinterleaving (e.g., 100 GHz spacing to 200 GHz spacing, 50 GHz spacing to 100 GHz spacing), comb filters having a different number of glass plates and multiple layers of interleaving/deinterleaving (e.g., 50 GHz spacing to 200 GHz spacing) can also be provided.

A set of optical channels having a first spacing (e.g., 100 GHz, 50 GHz) is provided to deinterleaver 1320 via optical, fiber 1310. Deinterleaver 1320 separates the set of channels into even and odd channels as described above. The odd channels are input to demultiplexer 1330 and the even channels are input to demultiplexer 1335. Demultiplexer 1330 separates the odd channels and outputs each channel on a separate fiber. Similarly, demultiplexer 1335 separates the even channels and outputs each channel on a separate fiber.

The individual channels provided by demultiplexers 1330 and 1335 are provided to various optical devices (not shown in FIG. 13). The optical devices operate on the individual channels as appropriate and output individual (possibly modified) channels. The output channels are input to multiplexers 1340 and 1345. Multiplexer 1340 receives the odd channels and outputs a multiplexed set of odd channels. Similarly, multiplexer 1345 receives the even channels and outputs a multiplexed set of even channels.

Interleaver 1350 receives the odd channels from multiplexer 1340 and the even channels from multiplexer 1345. Interleaver 1350 interleaves the odd and even channels as described above. The interleaved set of even and odd channels is output via optical fiber 1360.

Figure 14:
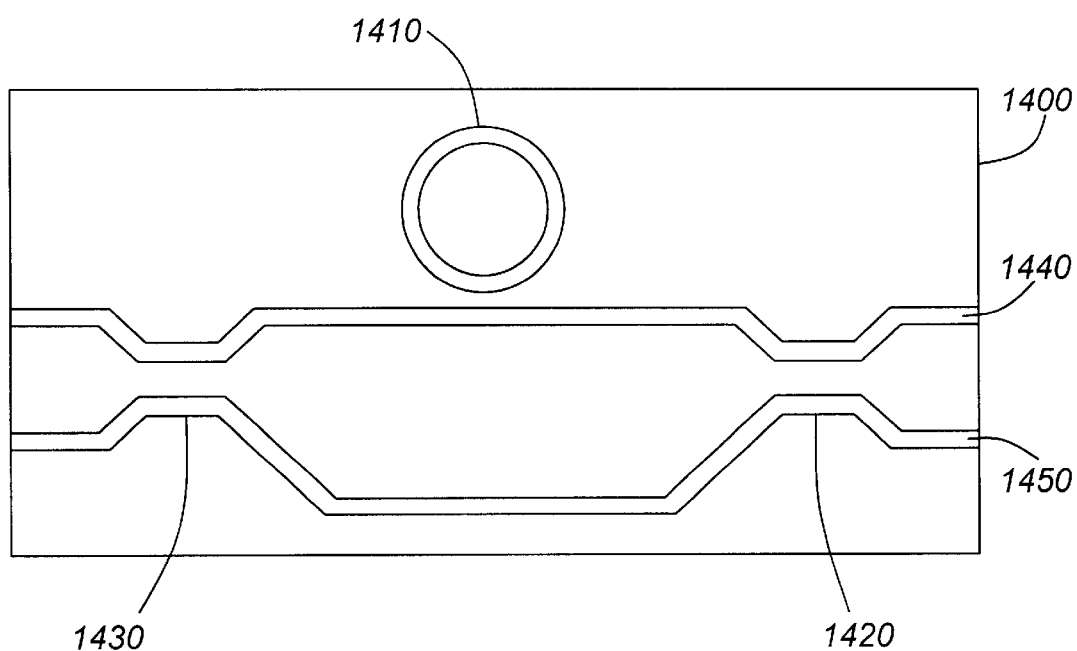
FIG. 14 illustrates one embodiment of an unequal path length Mach-Zhender interferometer with a ring phase shifter.

FIG. 14 illustrates one embodiment of an unequal path length Mach-Zhender interferometer with a ring phase shifter. Interferometer 1400 provides a phase and intensity response of reflected light approximately equal to the spectral properties illustrated in FIG. 6 above. By introducing a phase shifting element, interferometer 1400 provides spectral transmission characteristics similar to the Michelson interleaver described above.

Ring phase shifter 1410 provides non-linear phase modulation with little or no attenuation. The signals communicated by wave guides 1440 and 1450 are attenuated by 3 dB splitters 1420 and 1430 that provide linear phase shifting. The combination of attenuation by 3 dB splitters 1420 and 1430, and non-linear phase modulation by ring phase shifter 1410 provide enough bandwidth with large isolation to isolate optical channels.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An interleaver comprising:
   a beam splitter to split an input optical beam into a first sub-beam and a second sub-beam;
   an etalon coupled to receive the first sub-beam, the etalon having a reflective surface to reflect signals passed through the etalon; and
   a non-linear phase shifter coupled to receive the second sub-beam, the phase shifter modifying a phase of the second sub-beam, the modified phase of the second sub-beam causing constructive and destructive optical interference between the reflected first sub-beam and the reflected second sub-beam to cause a first subset of signals from the input optical beam to be directed to a first port and the second subset of signals from the input optical beam to be directed to a second port.

2. The interleaver of claim 1, wherein the non-linear phase shifter comprises a Fabry-Perot phase shifter.

3. The interleaver of claim 2, wherein the non-linear phase shifter comprises:
   a first plate through which an optical axis passes;
   a first reflective surface aligned with the optical axis; and
   a second reflective surface aligned with the optical axis, wherein a gap exists between the first reflective surface and the second reflective surface, and further wherein the second reflective surface has a greater reflectivity than the first reflective surface.

4. The interleaver of claim 3, wherein the etalon comprises a gap such that the first sub-beam passes through the gap and the first sub-beam is reflected by the reflective surface of the etalon.

5. The interleaver of claim 4 wherein the non-linear phase shifter gap is greater than the etalon gap.

6. The interleaver of claim 4 wherein the etalon gap is greater than the non-linear phase shifter gap.

7. The interleaver of claim 4 wherein the non-linear phase shifter gap is approximately twice the etalon gap.

8. An optical deinterleaver comprising:
   a circulator;
   a first deinterleaver component optically coupled to the circulator, the first interleaver component having
      a first port optically coupled to the circulator,
      a beam splitter to split the input optical beam into a first sub-beam and a second sub-beam,
      an etalon coupled to receive the first sub-beam, the etalon having a reflective surface to reflect signals passed through the etalon, and
      a non-linear phase shifter coupled to receive the second sub-beam, the phase shifter modifying a phase of the second sub-beam, the modified phase of the second sub-beam causing constructive and destructive optical interference between the reflected first sub-beam and the reflected second sub-beam to cause a first subset of signals from the input optical beam to be directed to the first port and the second subset of signals from the input optical beam to be directed to an output port;
   a second deinterleaver component optically coupled to the circulator, the second interleaver component having
      a first port optically coupled to the circulator to receive the first subset of signals from the circulator,
      a beam splitter to split the first subset of signals into a first sub-beam and a second sub-beam,
      an etalon coupled to receive the first sub-beam, the etalon having a reflective surface to reflect signals passed through the etalon, and
      a non-linear phase shifter coupled to receive the second sub-beam, the phase shifter modifying a phase of the second sub-beam, the modified phase of the second sub-beam causing constructive and destructive optical interference between the reflected first sub-beam and the reflected second sub-beam to cause the first subset of signals from the input optical beam to be directed to an output port.

9. The optical deinterleaver of claim 8 wherein the non-linear phase shifter of the first deinterleaver comprises Fabry-Perot phase shifter having:
   a first plate through which an optical axis passes;
   a first reflective surface aligned with the optical axis; and
   a second reflective surface aligned with the optical axis, wherein a gap exists between the first reflective surface and the second reflective surface, and further wherein the second reflective surface has a greater reflectivity than the first reflective surface.

10. The optical deinterleaver of claim 8 wherein the etalon of the first deinterleaver comprises a gap such that the first sub-beam passes through the gap and the first sub-beam is reflected by the reflective surface of the etalon.

11. The optical deinterleaver of claim 10 wherein the etalon gap of the etalon of the first deinterleaver component is less than the gap of the Fabry-Perot phase shifter of the first deinterleaver component.

12. The optical deinterleaver of claim 10 wherein the gap of the Fabry-Perot phase shifter of the first deinterleaver component is approximately twice the gap of the etalon of the first deinterleaver component.

13. The optical deinterleaver of claim 10 wherein the first reflective surface of the non-linear phase shifter is in the range of 10% to 20% reflective and the second reflective surface of the non-linear phase shifter is in the range of 90% to 100% reflective.

14. The optical deinterleaver of claim 8 wherein the non-linear phase shifter of the second deinterleaver comprises Fabry-Perot phase shifter having:
   a first plate through which an optical axis passes;
   a first reflective surface aligned with the optical axis; and
   a second reflective surface aligned with the optical axis, wherein a gap exists between the first reflective surface and the second reflective surface, and further wherein the second reflective surface has a greater reflectivity than the first reflective surface.

15. The optical deinterleaver of claim 14 wherein the etalon of the second deinterleaver comprises a gap such that the first sub-beam passes through the gap and the first sub-beam is reflected by the reflective surface of the etalon.

16. The optical deinterleaver of claim 15 wherein the gap of the etalon of the second deinterleaver component is less than the gap of the Fabry-Perot phase shifter of the second deinterleaver component.

17. The optical deinterleaver of claim 15 wherein the gap of the Fabry-Perot phase shifter of the second deinterleaver component is approximately twice the gap of the etalon of the second deinterleaver component.

18. The optical deinterleaver of claim 15 wherein the first reflective surface of the non-linear phase shifter is in the range of 10% to 20% reflective and the second reflective surface of the non-linear phase shifter is in the range of 90% to 100% reflective.

19. An optical interleaver comprising:
   a circulator;
   a first interleaver component optically coupled to the circulator, the first interleaver component having
      a first port optically coupled to receive an optical beam a first set of optical signals;
      a second port optically coupled to the circulator,
      a beam splitter optically coupled to the first port, the beam splitter to split the input optical beam into a first sub-beam and a second sub-beam,
      an etalon coupled to receive the first sub-beam, the etalon having a reflective surface to reflect signals passed through the etalon, and
      a non-linear phase shifter coupled to receive the second sub-beam, the phase shifter modifying a phase of the second sub-beam, the modified phase of the second sub-beam causing constructive and destructive optical interference between the reflected first sub-beam and the reflected second sub-beam to cause a first set of optical signals to be directed to the second port;

a second deinterleaver component optically coupled to the circulator, the second interleaver component having a first port optically coupled to receive an optical beam a second set of optical signals;

a second port optically coupled to the circulator to receive the first set of optical signals, a beam splitter optically coupled to the first port, the beam splitter to split the input optical beam into a first sub-beam and a second sub-beam, an etalon coupled to receive the first sub-beam, the etalon having a reflective surface to reflect signals passed through the etalon, and a non-linear phase shifter coupled to receive the second sub-beam, the phase shifter modifying a phase of the second sub-beam, the modified phase of the second sub-beam causing constructive and destructive optical interference between the reflected first sub-beam and the reflected second sub-beam to cause a set of optical signals comprising the first set of optical signals and the second set of optical signals to be directed to the second port.

20. The optical interleaver of claim 19 wherein the non-linear phase shifter of the first interleaver comprises Fabry-Perot phase shifter having:

a first plate through which an optical axis passes;

a first reflective surface aligned with the optical axis; and a second reflective surface aligned with the optical axis, wherein a gap exists between the first reflective surface and the second reflective surface, and further wherein the second reflective surface has a greater reflectivity than the first reflective surface.

21. The optical interleaver of claim 20 wherein the etalon of the first interleaver comprises a gap such that the first sub-beam passes through the gap and the first sub-beam is reflected by the reflective surface of the etalon.

22. The optical interleaver of claim 21 wherein the gap of the etalon of the first interleaver component is less than the gap of the Fabry-Perot phase shifter of the first interleaver component.

23. The optical interleaver of claim 21 wherein the gap of the Fabry-Perot phase shifter of the first interleaver component is approximately twice the gap of the etalon of the first interleaver component.

24. The optical interleaver of claim 21 wherein the first reflective surface of the non-linear phase shifter is in the range of 10% to 20% reflective and the second reflective surface of the non-linear phase shifter is in the range of 90% to 100% reflective.

25. The optical interleaver of claim 19 wherein the non-linear phase shifter of the second interleaver comprises Fabry-Perot phase shifter having:

a first plate through which an optical axis passes;

a first reflective surface aligned with the optical axis; and a second reflective surface aligned with the optical axis, wherein a gap exists between the first reflective surface and the second reflective surface, and further wherein the second reflective surface has a greater reflectivity than the first reflective surface.

26. The optical interleaver of claim 19 wherein the etalon of the second interleaver comprises a gap such that the first sub-beam passes through the gap and the first sub-beam is reflected by the reflective surface of the etalon.

27. The optical interleaver of claim 26 wherein the gap of the etalon of the second interleaver component is less than the gap of the Fabry-Perot phase shifter of the second interleaver component.

28. The optical interleaver of claim 26 wherein the gap of the Fabry-Perot phase shifter of the second interleaver component is approximately twice the gap of the etalon of the second interleaver component.

29. The optical deinterleaver of claim 26 wherein the first reflective surface of the non-linear phase shifter is in the range of 10% to 20% reflective and the second reflective surface of the non-linear phase shifter is in the range of 90% to 100% reflective.

* * * * *